(12) United States Patent
Huang

(10) Patent No.: US 11,368,238 B2
(45) Date of Patent: Jun. 21, 2022

(54) SYSTEMS AND METHODS FOR BIT LEVEL SIGNAL PROCESSING

(71) Applicant: ZTE CORPORATION, Guangdong (CN)

(72) Inventor: Chen Huang, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 17/211,496

(22) Filed: Mar. 24, 2021

(65) Prior Publication Data
US 2021/0281345 A1 Sep. 9, 2021

Related U.S. Application Data

(63) Continuation of application No. PCT/CN2018/108462, filed on Sep. 28, 2018.

(51) Int. Cl.
*H04J 13/10* (2011.01)
*H04L 27/20* (2006.01)
*H04L 27/36* (2006.01)

(52) U.S. Cl.
CPC .............. *H04J 13/10* (2013.01); *H04L 27/20* (2013.01); *H04L 27/36* (2013.01)

(58) Field of Classification Search
CPC .......... H04J 13/10; H04L 27/20; H04L 27/36
USPC ...................................................... 375/298
See application file for complete search history.

(56) References Cited

U.S. PATENT DOCUMENTS

| 5,623,485 | A | * | 4/1997 | Bi | H04B 1/707 370/209 |
|---|---|---|---|---|---|
| 5,835,602 | A | | 11/1998 | Lang | |
| 6,970,563 | B1 | | 11/2005 | Risling | |
| 8,718,158 | B2 | | 5/2014 | Tzannes | |
| 2003/0147422 | A1 | * | 8/2003 | You | H04L 1/0068 370/468 |

(Continued)

FOREIGN PATENT DOCUMENTS

| CN | 104756434 A | 7/2015 |
|---|---|---|
| CN | 108206724 A | 6/2018 |

(Continued)

OTHER PUBLICATIONS

Interdigital Inc: "Implementation Aspects of Low Code Rate NOMA Schemes"; R1-1804859, 3GPP TSG RAN WG1, #92bis, Sanya, China, Apr. 16, 2018-Apr. 20, 2018 Apr. 7, 2018 (Apr. 7, 2018), XP051414211, 5 pages.

(Continued)

*Primary Examiner* — Kevin M Burd
(74) *Attorney, Agent, or Firm* — Duane Morris LLP

(57) ABSTRACT

This disclosure relates generally to wireless communications and, more particularly, to systems and methods for bit level processing to produce a scrambled data bit sequence that, after modulation, may produce a symbol sequence that matches a symbol sequence produced by symbol spreading. In one embodiment, a method performed by a communication device includes: encoding user data to produce a first data bit sequence; generating a result bit sequence based on a first scrambling bit sequence and the first data bit sequence; and transmitting a signal based on a scrambled data bit sequence scrambled with the result bit sequence.

18 Claims, 9 Drawing Sheets

(56) References Cited

U.S. PATENT DOCUMENTS

2010/0122143 A1    5/2010  Lee
2015/0103807 A1    4/2015  Montojo et al.

FOREIGN PATENT DOCUMENTS

CN      108270515 A    7/2018
WO    2018210256 A1   11/2018

OTHER PUBLICATIONS

Huawei et al: "Discussion on th design of SCMA"3GPP Draft; R1-1805907, 3GPP TSG RAN WG1, Meeting #93, Busan, Korea; May 21, 2018-May 25, 2018 May 12, 2018 (May 12, 2018), XP051462261, 9 pages.

* cited by examiner

SYSTEMS AND METHODS FOR BIT LEVEL SIGNAL PROCESSING

TECHNICAL FIELD

This disclosure relates generally to wireless communications and, more particularly, to systems and methods for bit level processing to produce a scrambled data bit sequence that, after modulation, may produce a symbol sequence that matches a symbol sequence produced by symbol spreading.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Symbol level spreading has been used in code division multiple access (CDMA) systems, where long spreading sequences are applied to randomize the inter-user and inter-cell interference. Uplink signals from different users may be spread using user-specific scrambling codes and superimposed with each other in shared time or frequency resources. Though user interference may be introduced by non-orthogonal transmission, a particular quality of service can be better guaranteed with a larger spreading factor for symbol level spreading. However, typically, the longer the spreading factor the lower the data rate and, thus, suitability for wideband services in standards such as the long term evolution (LTE) or 5th generation (5G NR) wireless systems.

FIG. 1A is a block diagram 100 that illustrates transmitter side processing. The block diagram 100 references a user data layer of an arbitrary user (e.g., the ith user). At block 102, the transmitter side processing may start with user data that is processed by a channel encoder (e.g processed by encoding). At block 104, the user data may be subsequently processed by rate matching. At block 106, the user data may be subsequently processed by bit interleaving. At block 108, the user data may be subsequently processed by bit scrambling. At block 110, the user data may be subsequently processed by a modulator. At block 112, the user data may be subsequently processed by resource mapping before transmission.

FIG. 1B is a block diagram 150 that illustrates transmitter side non-orthogonal multiple access (NOMA) processing. The block diagram 150 references user layer data of an arbitrary user (e.g., the ith user). At block 152, the transmitter side processing may start with user data that is processed by a channel encoder. At block 154, the user data may be subsequently processed by rate matching or repetition. At block 156, the user data may be subsequently processed by user equipment (UE) specific bit interleaving or scrambling. At block 158, the user data may be subsequently processed by a UE specific modulator. At block 110, the user data may be subsequently processed by UE specific symbol spreading. At block 112, the user data may be subsequently processed by resource mapping before transmission.

This type of NOMA based transmitter side processing may involve channel coding with UE-specific bit-level scrambling or interleaving, UE-specific modulation or UE-specific symbol-level spreading. This is reflected in blocks 156, 158, 160. NOMA schemes based on bit-level processing may have less specification impact. For example, interleaving and scrambling processing may already be included in current specifications with a transmitter. Accordingly, changes in transmissions under a NOMA scheme may be generally directed to scrambling. Also, the design of scrambling bit sequences may be directed to reduce inter-user interference. In conjunction with transmission based processing, a soft-input-soft-output (SISO) iterative decoding processes that includes soft interference cancellation may be utilized to further reduce inter-user interference at the receiver for multi-user detection.

Symbol level spreading based NOMA schemes may not change processing at the bit level. In addition, the above referenced UE-specific spreading sequences are mainly used for UE differentiation and interference reduction. The de-spreading and channel equalization (with consideration of multi-user interferences) can be achieved simultaneously through minimum mean square error (MMSE) equalization from joint code and spatial domains. For example, a single-user decoder can be utilized for bit-level processing at the receiver side. Also, no fundamental change may be required on the receiver side to implement symbol-level spreading.

For symbol level spreading based NOMA schemes, the cross-correlation property of the spreading sequences between different UEs may be important to overall system performance. A design target for the spreading sequences may be to meet a welch-bound equality (WBE) criteria for cross-correlation among sequences. By meeting the WBE criteria, the mean squared error (MSE) per user may be reduced under the assumption of equal signal noise ratio (SNR) distribution among NOMA users. Stated another way, cross-correlation may be related to spreading length and the size of a sequence pool. For example, smaller overall cross-correlation can be achieved with a longer spreading length. Also, higher cross-correlation may be achieved when a larger sequence pool is used to accommodate more UEs at a given spreading factor.

Certain systems may have relatively lower spectral efficiency per UE and use relatively shorter spreading lengths than other systems. Given a shorter spreading length, complex-valued sequences can provide a larger sequence pool size compared with pseudo-noise (PN) sequences. For example, the length-L sequence with each of the element picked from $\{-1, 1, -j, j\}$ may have $4^L$ different sequences, while PN sequences (element picked from $\{-1, 1\}$) may have only $2^L$ different sequences.

Accordingly, symbol level spreading or symbol spreading may be introduced to multiplex a greater number of users and to achieve a higher sum spectral efficiency than orthogonal resource based transmissions. Spreading based schemes are normally operated at a symbol level, where a low inter-user interference may be achieved by using low cross-correlation sequences such as welch bound equality (WBE) sequences, or using low density spreading codes such as sparse codes. A minimum mean squared error criterion with successive interference cancellation (MMSE-SIC) receiver can be used to achieve certain levels of interference rejection among multiple users at the symbol-level in joint code and spatial domains. However, the current standards may not support symbol level spreading for certain data transmissions. Therefore, there is a need to achieve the particular level of service that symbol spreading would provide through other techniques.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: encoding user data to produce a first data bit sequence; generating a result bit sequence based on a first scrambling bit sequence and the first data bit sequence; and transmitting a signal based on a scrambled data bit sequence scrambled with the result bit sequence.

In a further embodiment, a method performed by a communication node includes: encoding user data to produce a first data bit sequence; generating a result bit sequence based on a first scrambling bit sequence and the first data bit sequence; and transmitting a signal based on a scrambled data bit sequence scrambled with the result bit sequence.

In a further embodiments, a communication device includes: at least one processor configured to: encode user data to produce a first data bit sequence, and generate a result bit sequence based on a first scrambling bit sequence and the first data bit sequence; and at least one transmitter configured to: transmit a signal based on a scrambled data bit sequence scrambled with the result bit sequence.

In a further embodiment, a communication node includes: at least one processor configured to: encode user data to produce a first data bit sequence, and generate a result bit sequence based on a first scrambling bit sequence and the first data bit sequence; and at least one transmitter configured to: transmit a signal based on a scrambled data bit sequence scrambled with the result bit sequence.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

The discussion below may refer to functional entities, such as a BS, UE, core network, cell, etc. (either in physical or virtual form), which are similar to those mentioned above with respect to conventional communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Figure 1A:
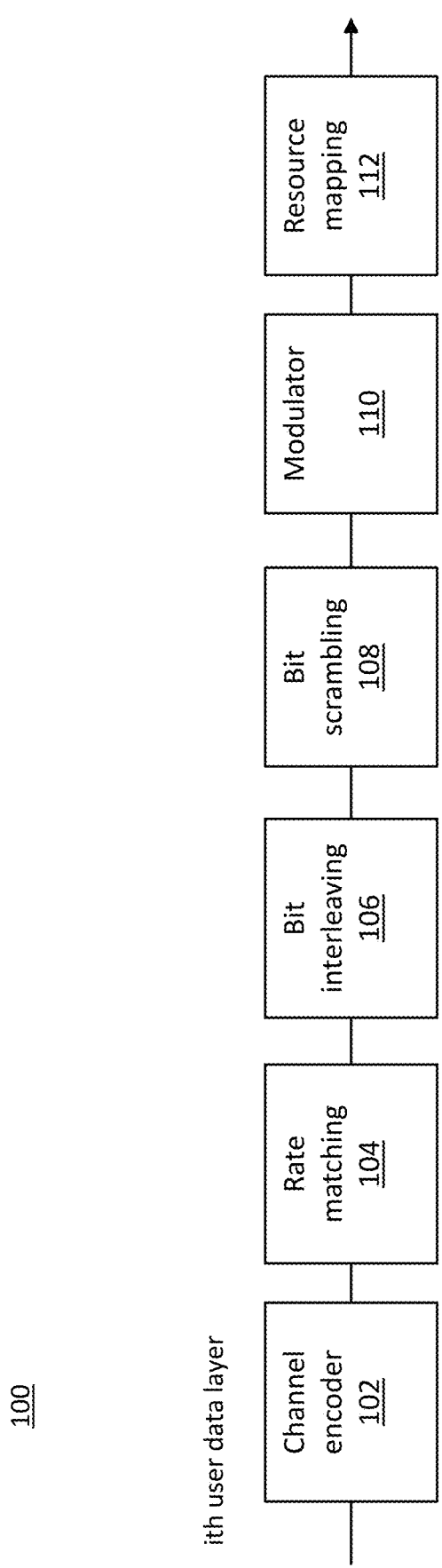
FIG. 1A is a block diagram that illustrates transmitter side processing.
Figure 1B:
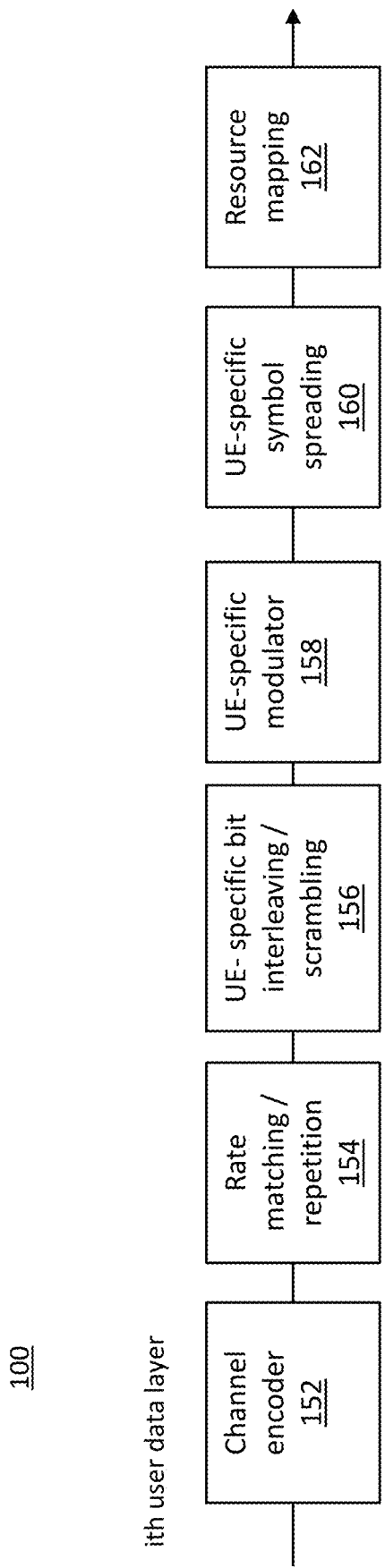
FIG. 1B is a block diagram that illustrates transmitter side non-orthogonal multiple access (NOMA) processing.
Figure 2:
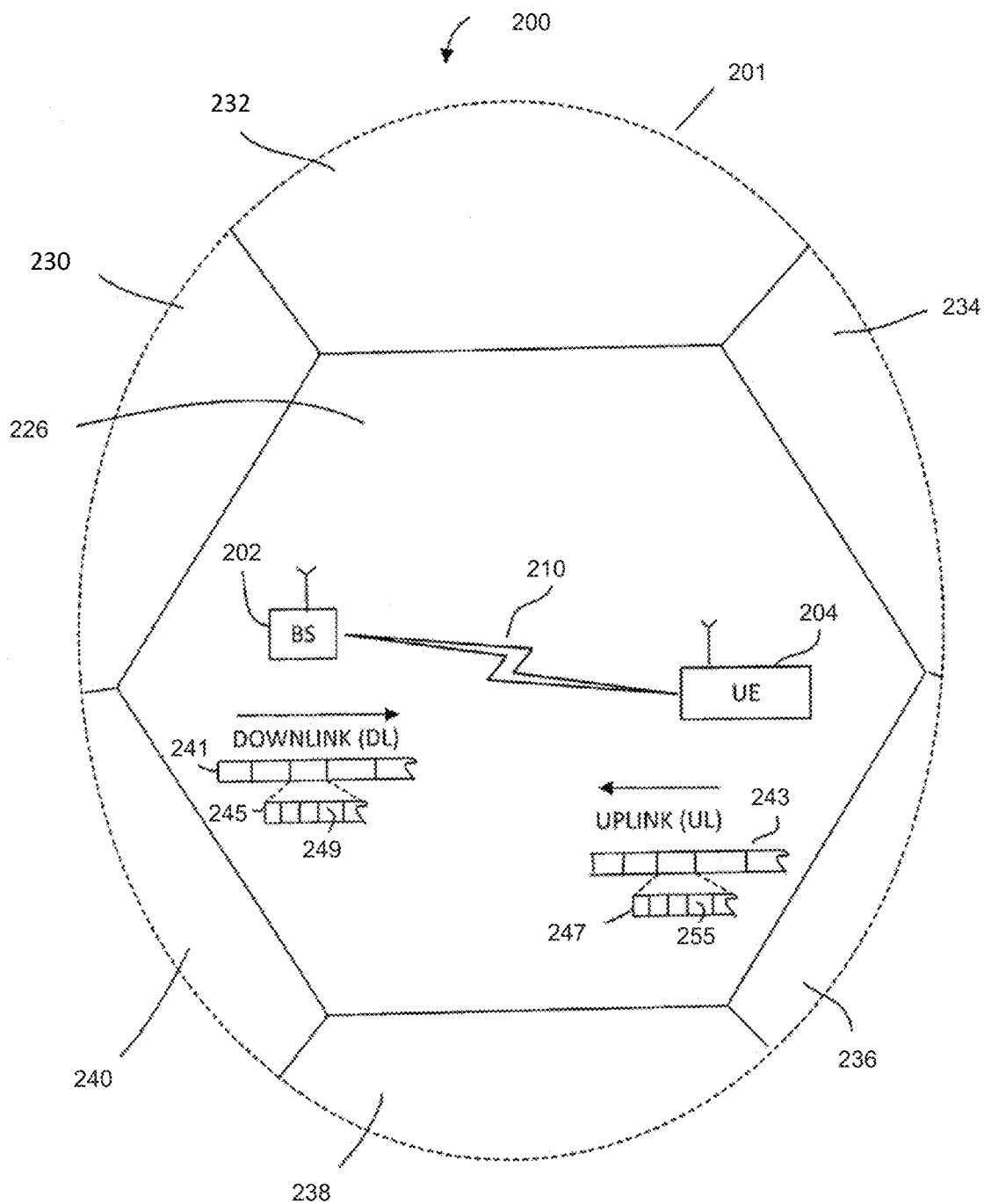
FIG. 2 illustrates an exemplary wireless communication network in which techniques disclosed herein may be implemented, in accordance with an embodiment of the present disclosure.

FIG. 2 illustrates an exemplary wireless communication network 200 in which techniques disclosed herein may be implemented, in accordance with an embodiment of the present disclosure. The exemplary communication network 200 may overlay a geographic area 201 and include a base station (BS) 202 and a user equipment (UE) device 204 (e.g., UE 204) that can communicate with each other via a communication link 210 (e.g., a wireless communication channel), and a cluster of notional cells 226, 230, 232, 234, 236, 238 and 240. In FIG. 2, the BS 202 and UE 204 are contained within the geographic boundary of cell 226. Each of the other cells 230, 232, 234, 236, 238 and 240 may include at least one base station (BS) operating at its allocated bandwidth to provide adequate radio coverage to its intended users. For example, the BS 202 may operate at an allocated channel transmission bandwidth to provide adequate coverage to the UE 204. The BS 202 and the UE 204 may communicate via a downlink radio frame 241 for BS/UE communications, and an uplink radio frame 243 for BS/UE communications respectively. Each radio frame 245/247 may be further divided into sub-frames 249/251 which may include data symbols 253/255. Accordingly, reference to a cell may also be a short hand reference to a BS with an associated cellular coverage region or area.

In the present disclosure, the base station (BS) 202 and user equipment (UE) 204 are described herein as non-limiting examples of "communication nodes," generally, which can practice the methods disclosed herein. Such communication nodes may be capable of wireless and/or wired communications, in accordance with various embodiments of the invention. Each of these communication nodes may be a transmitter in one situation and a receiver in another situation. For example, a BS 202 may transmit to a UE 204, such as during a downlink (DL), discussed further below. Therefore, the BS 202 may be a transmitter and the UE 204 may be a receiver. However, in another situation (such as during an uplink (UL), described further below) the UE 204 may be a transmitter and the BS 202 may be a receiver. Accordingly, both the BS 202 and the UE 204 may be a receiver or a transmitter. In certain embodiments, a communication device may refer to a UE while a communication node may refer to a BS to differentiate from the UE. Furthermore, the term "downlink (DL)" and "uplink (UL)" may be relative terms that describe a relative direction of information flow relative to a BS and/or UE's orientation within a system.

Figure 3:
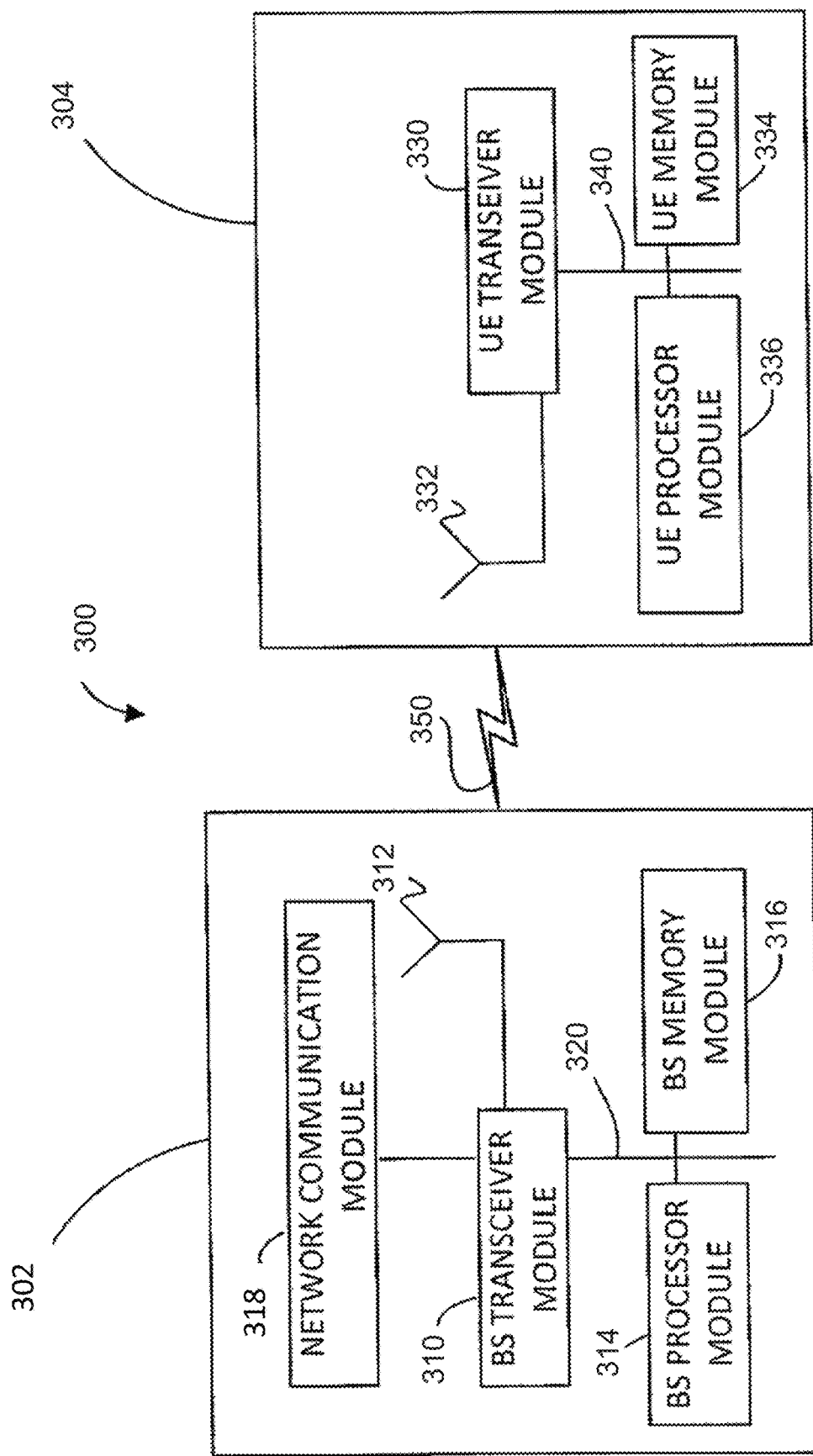
FIG. 3 illustrates block diagrams of an exemplary system including a base station (BS) and user equipment (UE), in accordance with some embodiments.

FIG. 3 illustrates block diagrams of an exemplary system 300 including a base station (BS) 302 and user equipment (UE) 304 for transmitting and receiving wireless communication signals, e.g., OFDM/OFDMA signals, between each other. The system 300 may include components and elements configured to support known or conventional operating features that need not be described in detail herein. In one exemplary embodiment, system 300 can be used to transmit and receive data symbols in a wireless communication environment such as the wireless communication environment 200 of FIG. 2, as described above.

The BS 302 includes a BS transceiver module 310, a BS antenna 312, a BS processor module 314, a BS memory module 316, and a network communication module 318, each module being coupled and interconnected with one another as necessary via a data communication bus 320. In certain embodiments, the data communications bus 320 may be implemented as a wireless bus from which modules or other portions of the BS 302 may communicate with each other wirelessly.

The UE 304 includes a UE transceiver module 330, a UE antenna 332, a UE memory module 334, and a UE processor module 336, each module being coupled and interconnected with one another via a data communication bus 340. The BS 302 communicates with the UE 304 via a communication channel (e.g., link) 350, which can be any wireless channel or other medium known in the art suitable for transmission of data as described herein.

As would be understood by persons of ordinary skill in the art, system 300 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 330 may include a RF transmitter and receiver circuitry that are each coupled to the antenna 332. A duplex switch (not shown) may alternatively couple a transmitter or receiver to the uplink antenna in time duplex fashion. Similarly, in accordance with some embodiments, the BS transceiver 310 may include RF transmitter and receiver circuitry that are each coupled to the antenna 312. A duplex switch may alternatively couple a transmitter or receiver to the antenna 312 in time duplex fashion. The operations of the two transceivers 310 and 330 are coordinated in time such that the receiver is coupled to the antenna 332 for reception of transmissions over the wireless transmission link 350 at the same time that the transmitter is coupled to the antenna 312. Preferably there is close time synchronization with only a minimal guard time between changes in duplex direction.

The UE transceiver 330 and the base station transceiver 310 are configured to communicate via the wireless data communication link 350, and cooperate with a suitably configured RF antenna arrangement 312/332 that can support a particular wireless communication protocol and modulation scheme. In some exemplary embodiments, the UE transceiver 308 and the base station transceiver 310 are configured to support industry standards such as the Long Term Evolution (LTE) and emerging 5G and New Radio (NR) standards, and the like. It is understood, however, that the invention is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory or non-transitory memory for storing instructions (e.g., computer readable instructions) to be executed by the processor modules 314 and 336, respectively.

The network communication module 318 generally represents the hardware, software, firmware, processing logic, and/or other components of the BS 302 that enable bi-directional communication between base station transceiver 310 and other network components and communication nodes configured to communication with the BS 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)).

Figure 4:
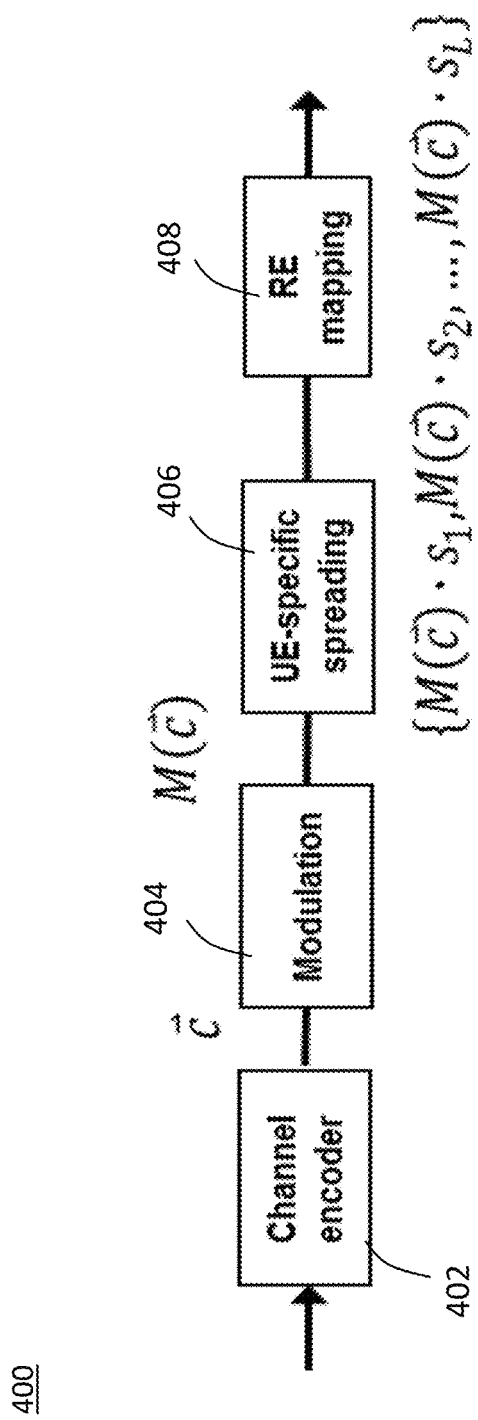
FIG. 4 is a block diagram illustrating signal processing for symbol level spreading, in accordance with various embodiments.

FIG. 4 is a block diagram 400 illustrating signal processing for symbol level spreading, in accordance with various embodiments. At block 402, data bits may be processed by a channel encoded to produce a coded binary data bit sequence $\vec{c}$. At block 404, the coded binary data bit sequence $\vec{c}$ as output by block 402 may be modulated as a symbol sequence $M(\vec{c})$ through a modulator (e.g., modulation via quadrature phase shift keying (QPSK), or any type of quadrature amplitude modulation (M-QAM)). At block 406, the symbol sequence $M(\vec{c})$ as output by block 404 may be spread in a UE-specific manner with the length-L spreading sequence $\{s_1, s_2, \ldots, s_L\}$. At block 408, the spread modulated symbol sequence as output by block 406 may be mapped to resource elements for transmission.

Figure 5:
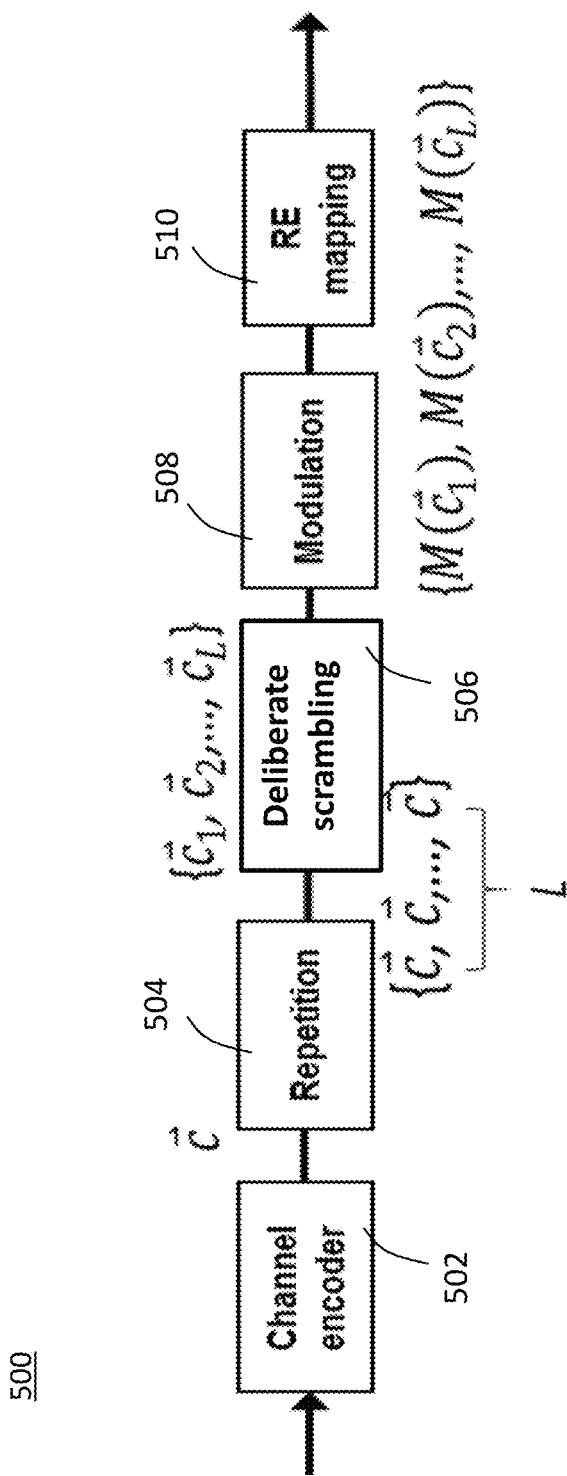
FIG. 5 is a block diagram illustrating bit level signal processing to produce a same symbol sequence for resource mapping as that of FIG. 4, in accordance with various embodiments.

FIG. 5 is a block diagram 500 illustrating bit level signal processing to produce a same symbol sequence for resource mapping as that of FIG. 4, in accordance with various embodiments. At block 502, data bits may be processed by a channel encoder to produce a coded binary data bit sequence $\vec{c}$. At block 504, the coded binary data bit sequence $\vec{c}$ may undergo bit level repetition (e.g., duplication) to achieve a same length as a length-L spreading sequence $\{s_1, s_2, \ldots, s_L\}$. Stated another way, at block 504, the coded binary data bit sequence $\vec{c}$ may undergo bit level repetition by an "L" number of times that is equivalent to the length value "L" of the above referenced length-L spreading sequence $\{s_1, s_2, \ldots, s_L\}$. At block 506, after bit level repetition, the output of block 504 may undergo a deliberate scrambling (e.g., as part of updated scrambling bit sequence processing or updated data bit sequence processing, as will be discussed further below) by a scrambling bit sequence. At block 508, the scrambled output of block 506 may undergo modulation into a symbol sequence. At block 510, the modulated output of block 508 (e.g., a modulated scrambled data bit sequence) may be mapped to resource elements for transmission.

In certain embodiments, block diagram 500 may achieve the following relationship:

$$M(\vec{c}) \cdot s_l = M(\vec{c}_l), \text{ for each } l=1, \ldots, L.$$

where $M(\vec{c})$ is a modulated coded binary data bit sequence, $s_l$ is a scrambling bit sequence, $M(\vec{c}_l)$ is a modulated scrambled data bit sequence, l is an index value, and L is a length of a desired spreading sequence. Also, symbol level spreading with complex-valued elements picked from $\{1, -1, j, -j\}$ may represents a modulation constellation rotated by angles $\{0, \text{pi}, \text{pi}/2, -\text{pi}/2\}$. Accordingly, the relationship between a modulated coded binary data bit sequence that is symbol spread, notated as $M_l(\vec{c})$, and $M(\vec{c})$ may be expressed as follows:

$$\begin{cases} M_l(\vec{c}) = M(\vec{c}), & \text{if } s_l = 1; \\ M_l(\vec{c}) = M(\vec{c}) * e^{-\pi j}, & \text{if } s_l = -1; \\ M_l(\vec{c}) = M(\vec{c}) * e^{\frac{\pi}{2} j}, & \text{if } s_l = j; \\ M_l(\vec{c}) = M(\vec{c}) * e^{-\frac{\pi}{2} j}, & \text{if } s_l = -j; \end{cases}$$

As noted above, a data bit sequence may be scrambled to produce a scrambled data bit sequence that is then modulated to produce a symbol sequence. This symbol sequence may be equivalent to another symbol sequence produced by having the same data bit sequence being directly modulated and symbol spread.

These techniques to produce such a symbol sequence without symbol level spreading may be termed either as updated scrambling bit sequence processing or updated data bit sequence processing. Updated scrambling bit sequence processing may include generating an updated scrambling bit sequence with a scrambling bit sequence and a data bit sequence. Then the updated scrambling bit sequence is used to scramble the data bit sequence. Updated data bit sequence processing may include generating an updated data bit sequence with a scrambling bit sequence and a data bit sequence. Then the updated data bit sequence is scrambled with the scrambling bit sequence.

For both updated scrambling bit sequence processing and updated data bit sequence processing, user data may be encoded to produce a first data bit sequence (e.g., an original data bit sequence). Then, an exclusive OR (XOR) operation may be performed on two adjacent most significant bits of a first scrambling bit sequence (e.g., an original scrambling bit sequence) to produce a scrambling bit value. Then, the XOR operation may be performed on each two adjacent bits of the first data bit sequence to produce a second data bit sequence. Then, an AND operation may be performed on the scrambling bit value and the second data bit sequence to produce a result bit sequence. This result bit sequence may be utilized to produce the scrambled data bit sequence referenced above.

However, for updated scrambling bit sequence processing, an XOR operation may be performed on the result bit sequence with each corresponding two adjacent bits of the first scrambling bit sequence to produce an updated scrambling bit sequence. Then, the first data bit sequence may be scrambled with the updated scrambling bit sequence to produce the scrambled data bit sequence.

Also, for updated data bit sequence processing, an XOR operation may be performed on the result bit sequence with each corresponding two adjacent bits of the first data bit sequence to produce an updated data bit sequence. Then, the updated data bit sequence may be scrambled with the first scrambling bit sequence to produce the scrambled data bit sequence referenced above.

Stated another way, in one embodiment of updated scrambling bit sequence processing, the first two scrambling bits of a scrambling bit sequence (e.g., a first scrambling bit sequence) for each symbol may be XORed to get a scrambling-XOR-bit-1 (e.g., a scrambling bit value). Then each two bits of the data bit sequence (e.g., a first data bit sequence) for each symbol are XORed to get a data-XOR-bit-k (e.g., a second data bit sequence). Then, the scrambling-XOR-bit-1 and the data-XOR-bit-k are ANDed to get a result-bit-k (e.g., a result bit sequence). Then the result-bit-k is XORed with the corresponding two bits of the scrambling bit sequence for the same symbol to generate the updated scrambling bit sequence. Then the updated scrambling bit sequence is used to scramble the data bit sequence in a conventional manner.

For example, let $\{b_0, b_1, b_2, b_3, \ldots b_{2K-2}, b_{2K-1}\}$ be the first data bit sequence. Also, let $\{a_0, a_1, a_2, a_3, \ldots a_{2K-2}, a_{2K-1}\}$ be the first scrambling bit sequence. The scrambling-XOR-bit-1 (e.g., the scrambling bit value) $Xs_1$ is calculated by $Xs_1 = a_0 \oplus a_1$. Also, the data-XOR-bit-k (e.g., the second data bit sequence) $Xd_k$ is calculated by $Xd_k = b_{2k-2} \oplus b_{2k-1}$, k=1, 2, ... K. The result-bit-k (e.g., a result bit sequence) $R_k$ is calculated by $R_k = Xs_1 \times Xd_k$. Furthermore, the updated scrambling bit sequence is produced or updated by $\bar{a}_{2k-2} = a_{2k-2} \oplus R_k$, $\bar{a}_{2k-1} = a_{2k-1} \oplus R_k$. Then the first data bit sequence is scrambled by the updated scrambling bit sequence to get the scrambled data bit sequence: $\{\bar{b}_0, \bar{b}_1, \ldots \bar{b}_{2K-2}, \bar{b}_{2K-1}\} = \{b_0, b_1, \ldots b_{2K-2}, b_{2K-1}\} \oplus \{\bar{a}_0, \bar{a}_1, \ldots \bar{a}_{2K-2}, \bar{a}_{2K-1}\}$.

In one embodiment of updated data bit sequence processing, the first two scrambling bits of a scrambling bit sequence (e.g., a first scrambling bit sequence) for each symbol are XORed to get a scrambling-XOR-bit-1 (e.g., a scrambling bit value). Then, for each two bits of the data bit sequence (e.g., first data bit sequence) for each symbol are XORed to get a data-XOR-bit-k (e.g., a second data bit sequence). Then, the scrambling-XOR-bit-1 and the data-XOR-bit-k are ANDed to get the result-bit-k (e.g., a result bit sequence). Then, the result-bit-k is XORed with the corresponding two bits of the data bit sequence for the same symbol to generate the updated data bit sequence. Then the updated data bit sequence is scrambled with the scrambling bit sequence in a conventional manner.

For example, let $\{b_0, b_1, b_2, b_3, \ldots b_{2K-2}, b_{2K-1}\}$ be the first data bit sequence. Also, let $\{a_0, a_1, a_2, a_3, \ldots a_{2K-2}, a_{2K-1}\}$ be the first bit scrambling bit sequence. The scrambling-XOR-bit-1 (e.g., the scrambling bit value) $Xs_1$ is calculated by $Xs_1 = a_0 \oplus a_1$. The data-XOR-bit-k (e.g., the second data bit sequence) $Xd_k$ is calculated by $Xd_k = b_{2k-2} \oplus b_{2k-1}$, k=1, 2, ... K. The result-bit-k (e.g., the result bit sequence) $R_k$ is calculated by $R_k = Xs_1 \times Xd_k$. Furthermore, the updated data bit sequence is produced or updated by $\bar{b}_{2k-2} = b_{2k-2} \oplus R_k$, $\bar{b}_{2k-1} = b_{2k-1} \oplus R_k$. Then the updated data bit sequence is scrambled with the scrambling bit sequence as in a conventional manner to get the scrambled data bit sequence: $\{\bar{b}_0, \bar{b}_1, \ldots \bar{b}_{2K-2}, \bar{b}_{2K-1}\} = \{\bar{b}_0, \bar{b}_1, \ldots \bar{b}_{2K-2}, \bar{b}_{2K-1}\} \oplus \{a_0, a_1, \ldots a_{2K-2}, a_{2K-1}\}$.

Figure 6:
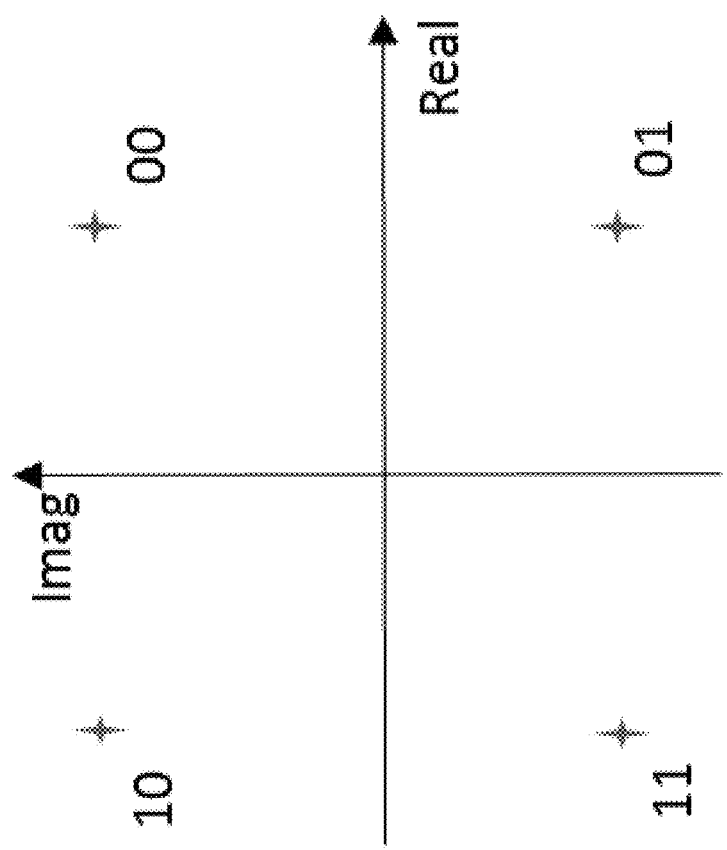

A number of updated scrambling bit sequence processing embodiments are described with the following figures. FIG. 6 is an illustration of a bit to symbol mapping constellation used in updated scrambling bit sequence processing, in accordance with some embodiments. The QPSK constellation 600 denotes having each two consecutive coded binary bits $\vec{c} = \{b_0, b_1\}$ mapped to one symbol and expressed with the following equation:

$$M(\vec{c}) = \frac{1}{\sqrt{2}}[(1 - 2b_0) + j(1 - 2b_1)].$$

In the above equation, $b_{2l}$ denotes the sign of the real part of the complex-valued modulation symbol, and $b_{2l+1}$ denotes the sign of the imaginary part (e.g., "imag") of the complex-valued modulation symbol. As illustrated, the QPSK constellation 600 may be symmetrical about two axes.

A scrambling bit sequence for QPSK (corresponding to spreading values $\{1\}$, $\{-1\}$, $\{j\}$, $\{-j\}$ may be $\{0,0\}$, $\{1,1\}$, $\{1,0\}$ and $\{0,1\}$. Thus, if $s_j=1$, then the original (e.g., first) scrambling bit sequence may be $\{0,0\}$. Thus, the scrambling-XOR-bit may be 0 and the result-bit-1 may be 0 and the updated scrambling bit sequence may be $\{0,0\}$ irrespective of the data bit sequence. This may be expressed as follows:

$$M(\{\bar{b}_0, \bar{b}_1\}) = M(\{b_0, b_1\} \oplus \{0, 0\}) = M(\{b_0, b_1\})$$
$$= \frac{1}{\sqrt{2}}[(1 - 2b_0) + j(1 - 2b_1)] = M(\{b_0, b_1\}) * 1$$

In certain embodiments, if $s_j=-1$, then the original (e.g., first) scrambling bit sequence is $\{1,1\}$. Thus, the scrambling-XOR-bit is 0 and the result-bit-1 is 0 and the updated scrambling bit sequence is $\{1,1\}$ irrespective of the data bit sequence. This may be expressed as follows:

$$M(\{\bar{b}_0, \bar{b}_1\}) = M(\{b_0, b_1\} \oplus \{1, 1\})$$
$$= M(\{1 - b_0, 1 - b_1\})$$
$$= \frac{1}{\sqrt{2}}[(1 - 2(1 - b_0)) + j(1 - 2(1 - b_1))]$$
$$= M(\{b_0, b_1\}) * -1$$

In certain embodiments, if $s_j=j$, then the original (e.g., first) scrambling bit sequence is $\{1,0\}$, so the scrambling-XOR-bit is 1. Also, if $\{b_0,b_1\}=\{0,0\}$, then the data-XOR-bit-1 is 0, and the result-bit-1 is 0. Thus, the updated scrambling bit sequence is $\{1,0\}$ and the scrambled bit sequence of this symbol is $\{1,0\}$, which can be modulated to a symbol equivalent to the symbol modulated by $\{0,0\}$ and multiplied with j. This may be expressed as follows:

$$\begin{aligned}M(\{\tilde{b}_0, \tilde{b}_1\}) &= M(\{b_0, b_1\} \oplus \{1, 0\}) \\ &= M(\{0, 0\} \oplus \{1, 0\}) \\ &= M(\{1, 0\}) \\ &= \frac{1}{\sqrt{2}}[-1+j] \\ &= \frac{1}{\sqrt{2}}[1+j]*j \\ &= M(\{0, 0\})*j \\ &= M(\{b_0, b_1\})*j\end{aligned}$$

However, if $\{b_0,b_1\}=\{0,1\}$, then the data-XOR-bit-1 is 1, and the result-bit-1 is 1. Thus, the updated scrambling bit sequence is $\{0,1\}$ and the scrambled bit sequence of this symbol is $\{0,0\}$, which can be modulated to a symbol equivalent to the symbol modulated by $\{0,1\}$ and multiplied with j. This may be expressed as follows:

$$\begin{aligned}M(\{\tilde{b}_0, \tilde{b}_1\}) &= M(\{b_0, b_1\} \oplus \{\bar{a}_0, \bar{a}_1\}) \\ &= M(\{0, 1\} \oplus \{0, 1\}) \\ &= M(\{0, 0\}) \\ &= \frac{1}{\sqrt{2}}[1+j] \\ &= \frac{1}{\sqrt{2}}[1-j]*j \\ &= M(\{0, 1\})*j \\ &= M(\{b_0, b_1\})*j\end{aligned}$$

However, if $\{b_0,b_1\}=\{1,0\}$, then the data-XOR-bit-1 is 1, and the result-bit-1 is 1. Thus, the updated scrambling bit sequence is $\{0,1\}$ and the scrambled bit sequence of this symbol is $\{1,1\}$, which can be modulated to a symbol equivalent to the symbol modulated by $\{1,0\}$ and multiplied with j. This may be expressed as follows:

$$\begin{aligned}M(\{\tilde{b}_0, \tilde{b}_1\}) &= M(\{b_0, b_1\} \oplus \{\bar{a}_0, \bar{a}_1\}) \\ &= M(\{1, 0\} \oplus \{0, 1\}) \\ &= M(\{1, 1\}) \\ &= \frac{1}{\sqrt{2}}[-1-j] \\ &= \frac{1}{\sqrt{2}}[-1+j]*j \\ &= M(\{1, 0\})*j \\ &= M(\{b_0, b_1\})*j\end{aligned}$$

However, if $\{b_0,b_1\}=\{1,1\}$, then the data-XOR-bit-1 is 0, and the result-bit-1 is 0. Thus, the updated scrambling bit sequence is $\{1,0\}$ and the scrambled bit sequence of this symbol is $\{0,1\}$, which can be modulated to a symbol equivalent to the symbol modulated by $\{1,1\}$ and multiplied with j. This may be expressed as follows:

$$\begin{aligned}M(\{\tilde{b}_0, \tilde{b}_1\}) &= M(\{b_0, b_1\} \oplus \{\bar{a}_0, \bar{a}_1\}) \\ &= M(\{1, 1\} \oplus \{0, 1\}) \\ &= M(\{1, 1\}) \\ &= \frac{1}{\sqrt{2}}[-1-j] \\ &= \frac{1}{\sqrt{2}}[-1+j]*j \\ &= M(\{1, 0\})*j \\ &= M(\{b_0, b_1\})*j\end{aligned}$$

In certain embodiments, if $s_j=-j$, then the original scrambling bit sequence is $\{0,1\}$, and the scrambling-XOR-bit is 1. Also, if $\{b_0,b_1\}=\{0,0\}$, then the data-XOR-bit-1 is 0, and the result-bit-1 is 0. Thus, the updated scrambling bit sequence is $\{0,1\}$ and the scrambled bit sequence of this symbol is $\{0,1\}$, which can be modulated to a symbol equivalent to the symbol modulated by $\{0,0\}$ and multiplied with $-j$. This may be expressed as follows:

$$\begin{aligned}M(\{\tilde{b}_0, \tilde{b}_1\}) &= M(\{b_0, b_1\} \oplus \{\bar{a}_0, \bar{a}_1\}) \\ &= M(\{0, 0\} \oplus \{0, 1\}) \\ &= M(\{0, 1\}) \\ &= \frac{1}{\sqrt{2}}[1-j] \\ &= \frac{1}{\sqrt{2}}[1+j]*(-j) \\ &= M(\{0, 0\})*(-j) \\ &= M(\{b_0, b_1\})*(-j)\end{aligned}$$

However, if $\{b_0,b_1\}=\{0,1\}$, then the data-XOR-bit-1 is 1, and the result-bit-1 is 1. Thus, the updated scrambling bit sequence is $\{1,0\}$ and the scrambled bit sequence of this symbol is $\{1,1\}$, which can be modulated to a symbol equivalent to the symbol modulated by $\{0,1\}$ and multiplied with $-j$. This may be expressed as follows:

$$\begin{aligned}M(\{\tilde{b}_0, \tilde{b}_1\}) &= M(\{b_0, b_1\} \oplus \{\bar{a}_0, \bar{a}_1\}) \\ &= M(\{0, 1\} \oplus \{1, 0\}) \\ &= M(\{1, 1\}) \\ &= \frac{1}{\sqrt{2}}[-1-j] \\ &= \frac{1}{\sqrt{2}}[1-j]*(-j) \\ &= M(\{0, 1\})*(-j) \\ &= M(\{b_0, b_1\})*(-j)\end{aligned}$$

However, if $\{b_0,b_1\}=\{1,0\}$, then the data-XOR-bit-1 is 1, and the result-bit-1 is 1. Thus, the updated scrambling bit sequence is $\{1,0\}$ and the scrambled bit sequence of this symbol is $\{0,0\}$, which can be modulated to a symbol equivalent to the symbol modulated by $\{1,0\}$ and multiplied with $-j$. This may be expressed as follows:

$$M(\{\tilde{b}_0, \tilde{b}_1\}) = M(\{b_0, b_1\} \oplus \{\bar{a}_0, \bar{a}_1\})$$
$$= M(\{1, 0\} \oplus \{1, 0\})$$
$$= M(\{0, 0\})$$
$$= \frac{1}{\sqrt{2}}[1 + j]$$
$$= \frac{1}{\sqrt{2}}[-1 + j] * (-j)$$
$$= M(\{1, 0\}) * (-j)$$
$$= M(\{b_0, b_1\}) * (-j)$$

However, if $\{b_0, b_1\}=\{1,1\}$, then the data-XOR-bit-1 is 0, and the result-bit-1 is 0. Thus, the updated scrambling bit sequence is $\{0,1\}$ and the scrambled bit sequence of this symbol is $\{1,0\}$, which can be modulated to a symbol equivalent to the symbol modulated by $\{1,1\}$ and multiplied with $-j$. This may be expressed as follows:

$$M(\{\tilde{b}_0, \tilde{b}_1\}) = M(\{b_0, b_1\} \oplus \{0, 1\})$$
$$= M(\{1, 1\} \oplus \{0, 1\})$$
$$= M(\{1, 0\})$$
$$= \frac{1}{\sqrt{2}}[-1 + j]$$
$$= \frac{1}{\sqrt{2}}[-1 - j] * (-j)$$
$$= M(\{1, 1\}) * (-j)$$

Figure 7:
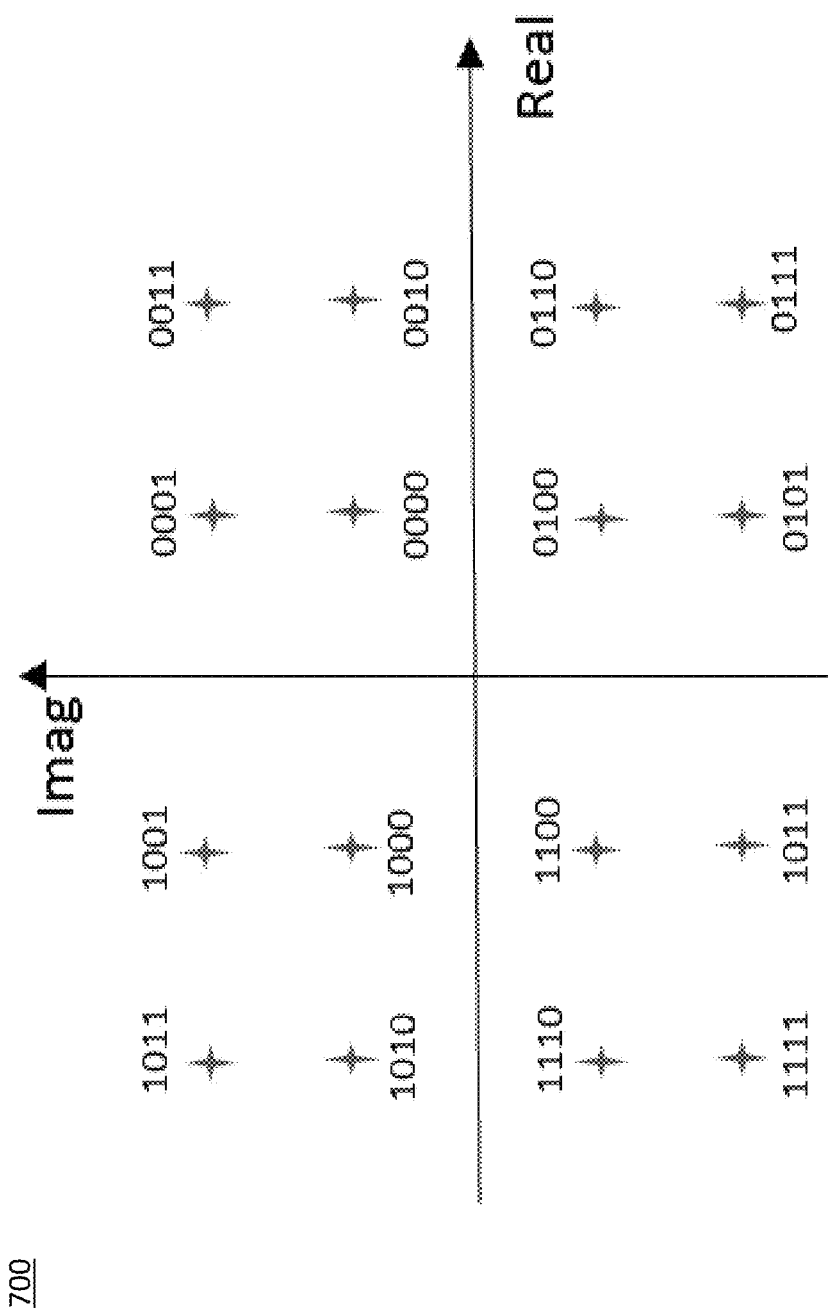
FIG. 7 is an illustration of a bit to symbol mapping for a 16 state quadrature amplitude modulation (16QAM) constellation used in updated scrambling bit sequence processing, in accordance with some embodiments.

FIG. 7 is an illustration of a bit to symbol mapping for a 16 state quadrature amplitude modulation (16QAM) constellation used in updated scrambling bit sequence processing, in accordance with some embodiments. The 16QAM constellation 700 denotes having each four consecutive coded binary bits $\vec{c}=\{b_0, b_1, b_2, b_3\}$ mapped to one symbol, as expressed with the following equation:

$$M(\vec{c}) = \frac{1}{\sqrt{10}}\{(1 - 2b_0)[2 - (1 - 2b_2)] + j(1 - 2b_1)[2 - (1 - 2b_3)]\}.$$

In the above equation, $b_0$ denotes the sign of the real part of the complex-valued modulation symbol, $b_1$ denotes the sign of the imaginary part, $b_2$ is used to distinguish the inner ring or outer ring of the real part, and $b_3$ is used to distinguish the inner ring or outer ring of the imaginary part of the complex-valued modulation symbol. Accordingly, the scrambling bit sequence corresponding to a 16QAM spreading value $\{1\}$, $\{-1\}$, $\{j\}$, $\{-j\}$ is $\{0,0,0,0\}$, $\{1,1,0,0\}$, $\{1,0,0,0\}$ and $\{0,1,0,0\}$.

In certain embodiments, if $s_l=1$, then the original scrambling bit sequence is $\{0,0,0,0\}$. Thus, the scrambling-XOR-bit is 0 and the result-bit-1 is 0 and the updated scrambling bit sequence is $\{0,0,0,0\}$ irrespective of the data bit sequence. This may be expressed as follows:

$$M(\{\tilde{b}_0, \tilde{b}_1\}) = M(\{b_0, b_1, b_2, b_3\} \oplus \{\bar{a}_0, \bar{a}_1, \bar{a}_2, \bar{a}_3\})$$
$$= M(\{b_0, b_1, b_2, b_3\} \oplus \{0, 0, 0, 0\})$$
$$= M(\{b_0, b_1, b_2, b_3\}) * 1$$

In certain embodiments, if $s_l=-1$, then the original scrambling bit sequence is $\{1,1,0,0\}$. Thus, the scrambling-XOR-bit is 0 and the result-bit-1 is 0 and the updated scrambling bit sequence is $\{1,1,0,0\}$ irrespective of the data bit sequence. This may be expressed as follows:

$$M(\{\tilde{b}_0, \tilde{b}_1\}) = M(\{b_0, b_1, b_2, b_3\} \oplus \{\bar{a}_0, \bar{a}_1, \bar{a}_2, \bar{a}_3\})$$
$$= M(\{b_0, b_1, b_2, b_3\} \oplus \{1, 1, 0, 0\})$$
$$= \frac{1}{\sqrt{2}}\{(1 - 2(1 - b_0))[2 - (1 - 2b_2)] +$$
$$j(1 - 2(1 - b_1))[2 - (1 - 2b_3)]\}$$
$$= -\frac{1}{\sqrt{2}}\{(1 - 2b_0)[2 - (1 - 2b_2)] + j(1 - 2b_1)[2 - (1 - 2b_3)]\}$$
$$= M(\{b_0, b_1, b_2, b_3\}) * -1$$

In certain embodiments, $s_l=j$ with the following relationship:

$$M(\vec{c}) * s_l = \frac{1}{\sqrt{10}}\{j(1 - 2b_0)[2 - (1 - 2b_2)] - (1 - 2b_1)[2 - (1 - 2b_3)]\}$$
$$= \frac{1}{\sqrt{10}}\{(1 - 2(1 - b_1))[2 - (1 - 2b_3)] +$$
$$j(1 - 2b_0)[2 - (1 - 2b_2)]\}$$
$$= M(\{1 - b_1, b_0, b_3, b_2\})$$

Then, in further embodiments, the original scrambling bit sequence $\{a_0, a_1, a_2, a_3\}$ is $\{1,0,0,0\}$. Thus, the scrambling-XOR-bit is 1. Also, when $b_0=b_1, b_2=b_3$ (e.g., $\{b_0, b_1, b_2, b_3\}=\{0,0,0,0\}$ or $\{0,0,1,1\}$ or d, then the data-XOR-bit-1 and data-XOR-bit-2, are both 0, and the result-bit-1 and result-bit-2 are both 0. Thus, the updated scrambling bit sequence is $\{1,0,0,0\}$ and the scrambled bit sequence of this symbol is $\{1-b_0, b_1, b_2, b_3\}$, which can be modulated to a symbol equivalent to the symbol modulated by $\{b_0, b_1, b_2, b_3\}$ and multiplied with $j$. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{1, 0, 0, 0\})$$
$$= M(\{1 - b_0, b_0, b_2, b_3\})$$
$$= M(\{1 - b_1, b_0, b_3, b_2\})$$
$$= M(\{b_0, b_1, b_2, b_3\}) * j$$

However, when $b_0=1-b_1, b_2=b_3$ (e.g., $\{b_0, b_1, b_2, b_3\}=\{1, 0,0,0\}$ or $\{1,0,1,1\}$ or $\{0,1,0,0\}$ or $\{0,1,1,1\}$), then the data-XOR-bit-1 and data-XOR-bit-2 are 1 and 0 respectively, and the result-bit-1 and result-bit-2 are 1 and 0 respectively. Thus, the updated scrambling bit sequence is $\{0,1,0,0\}$ and the scrambled bit sequence of this symbol is $\{1-b_0,b_1,b_2,b_3\}$, which can be modulated to a symbol equivalent to the symbol modulated by $\{b_0, b_1, b_2, b_3\}$ and multiplied with j. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{1, 0, 0, 0\})$$
$$= M(\{1-b_0, b_0, b_2, b_3\})$$
$$= M(\{1-b_1, b_0, b_3, b_2\})$$
$$= M(\{b_0, b_1, b_2, b_3\}) * j$$

However, when $b_0=b_1$, $b_2=1-b_3$ (e.g., $\{b_0, b_1, b_2, b_3\}=\{0,0,0,1\}$ or $\{0,0,1,0\}$ or $\{1,1,0,1\}$ or $\{1,1,1,0\}$), then the data-XOR-bit-1 and data-XOR-bit-2 are 0 and 1 respectively, and the result-bit-1 and result-bit-2 are 0 and 1 respectively. Thus, the updated scrambling bit sequence is $\{1,0,1,1\}$ and the scrambled bit sequence of this symbol is $\{1-b_0, b_1, 1-b_2, 1-b_3\}$, which can be modulated to a symbol equivalent to the symbol modulated by $\{b_0, b_1, b_2, b_3\}$ and multiplied with j. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{1, 0, 1, 1\})$$
$$= M(\{1-b_0, b_1, 1-b_2, 1-b_3\})$$
$$= M(\{1-b_1, b_0, b_3, b_2\})$$
$$= M(\{b_0, b_1, b_2, b_3\}) * j$$

However, when $b_0=1-b_1, b_2=1-b_3$ (e.g., $\{b_0,b_1,b_2,b_3\}=\{0,1,0,1\}$ or $\{0,1,1,0\}$ or $\{1,0,0,1\}$ or $\{1,0,1,0\}$), then the data-XOR-bit-1 and data-XOR-bit-2, are both 1, and the result-bit-1 and result-bit-2 are both 1. Thus, the updated scrambling bit sequence is $\{0,1,1,1\}$ and the scrambled bit sequence of this symbol is $\{b_0, 1-b_1, 1-b_2, 1-b_3\}$, which can be modulated to the symbol modulated by $\{b_0, b_1, b_2, b_3\}$ and multiplied with j. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{0, 1, 1, 1\})$$
$$= M(\{b_0, 1-b_1, 1-b_2, 1-b_3\})$$
$$= M(\{1-b_1, b_0, b_3, b_2\})$$
$$= M(\{b_0, b_1, b_2, b_3\}) * j$$

In certain embodiments, $s_i=-j$ with the following relationship:

$$M(\vec{c})*s_i = \frac{1}{\sqrt{10}}\{-j(1-2b_0)[2-(1-2b_2)] + (1-2b_1)[2-(1-2b_3)]\}$$
$$= \frac{1}{\sqrt{10}}\{(1-2b_1)[2-(1-2b_3)] +$$

$$j(1-2(1-b_0))[2-(1-2b_2)]\}$$
$$= M(\{b_1, 1-b_0, b_3, b_2\})$$

Then, in further embodiments, the original scrambling bit sequence $\{a_0, a_1, a_2, a_3\}$ is $\{0,1,0,0\}$, so the scrambling-XOR-bit is 1. Also, if $b_0=b_1$, $b_2=b_3$ (e.g., $\{b_0, b_1, b_2, b_3\}=\{0,0,0,0\}$ or $\{0,0,1,1\}$ or $\{1,1,0,0\}$ or $\{1,1,1,1\}$), then the data-XOR-bit-1 and data-XOR-bit-2, are both 0, and the result-bit-1 and result-bit-2 are both 0. Thus, the updated scrambling bit sequence is $\{0,1,0,0\}$ and the scrambled bit sequence of this symbol is $\{b_0, 1-b_1, b_2, b_3\}$, which can be modulated to a symbol equivalent to the symbol modulated by $\{b_0, b_1, b_2, b_3\}$ and multiplied with $-j$. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{0, 1, 0, 0\})$$
$$= M(\{b_0, 1-b_0, b_2, b_3\})$$
$$= M(\{b_1, 1-b_0, b_3, b_2\})$$
$$= M(\{b_0, b_1, b_2, b_3\}) * (-j)$$

However, when $b_0=1-b_1, b_2=b_3$ (e.g., $\{b_0, b_1, b_2, b_3\}=\{0,1,0,0\}$ or $\{0,1,1,1\}$ or $\{1,0,0,0\}$ or $\{1,0,1,1\}$), then the data-XOR-bit-1 and data-XOR-bit-2 are 1 and 0 respectively, and the result-bit-1 and result-bit-2 are 1 and 0 respectively. Thus, the updated scrambling bit sequence is $\{1,0,0,0\}$ and the scrambled bit sequence of this symbol is $\{1-b_0, b_1, b_2, b_3\}$, which can be modulated to a symbol equivalent to the symbol modulated by $\{b_0, b_1, b_2, b_3\}$ and multiplied with $-j$. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{1, 0, 0, 0\})$$
$$= M(\{1-b_0, b_1, b_2, b_3\})$$
$$= M(\{b_1, 1-b_0, b_3, b_2\})$$
$$= M(\{b_0, b_1, b_2, b_3\}) * (-j)$$

However, when $b_0=b_1$, $b_2=1-b_3$ (e.g., $\{b_0, b_1, b_2, b_3\}=\{0,0,0,1\}$ or $\{0,0,1,0\}$ or $\{1,1,0,1\}$ or $\{1,1,1,0\}$), then the data-XOR-bit-1 and data-XOR-bit-2 are 0 and 1 respectively, and the result-bit-1 and result-bit-2 are 0 and 1 respectively. Thus, the updated scrambling bit sequence is $\{0,1,1,1\}$ and the scrambled bit sequence of this symbol is $\{b_0, 1-b_1, 1-b_2, 1-b_3\}$, which can be modulated to a symbol equivalent to the symbol modulated by $\{b_0, b_1, b_2, b_3\}$ and multiplied with $-j$. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{0, 1, 1, 1\})$$
$$= M(\{b_0, 1-b_1, 1-b_2, 1-b_3\})$$
$$= M(\{b_1, 1-b_0, b_3, b_2\})$$
$$= M(\{b_0, b_1, b_2, b_3\}) * (-j)$$

However, when $b_0=1-b_1$, $b_2=1-b_3$ (e.g., $\{b_0, b_1, b_2, b_3\}=\{0,1,0,1\}$ or $\{0,1,1,0\}$ or $\{1,0,0,1\}$ or $\{1,0,1,0\}$), then the data-XOR-bit-1 and data-XOR-bit-2 are both 1, and the result-bit-1 and result-bit-2 are both 1. Thus, the updated scrambling bit sequence is $\{1,0,1,1\}$ and the scrambled bit sequence of this symbol is $\{1-b_0, b_1, 1-b_2, 1-b_3\}$, which can be modulated to a symbol equivalent to the symbol modulated by $\{b_0, b_1, b_2, b_3\}$ and multiplied with $-j$. This may be expressed as follows:

$$M(\{\tilde{b}_0, \tilde{b}_1, \tilde{b}_2, \tilde{b}_3\}) = M(\{b_0, b_1, b_2, b_3\} \oplus \{\bar{a}_0, \bar{a}_1, \bar{a}_2, \bar{a}_3\})$$
$$= M(\{b_0, b_0, b_2, b_2\} \oplus \{1, 0, 1, 1\})$$
$$= M(\{1-b_0, b_1, 1-b_2, 1-b_3\})$$
$$= M(\{b_1, 1-b_0, b_3, b_2\})$$
$$= M(\{b_0, b_1, b_2, b_3\}) * (-j)$$

Figure 8:
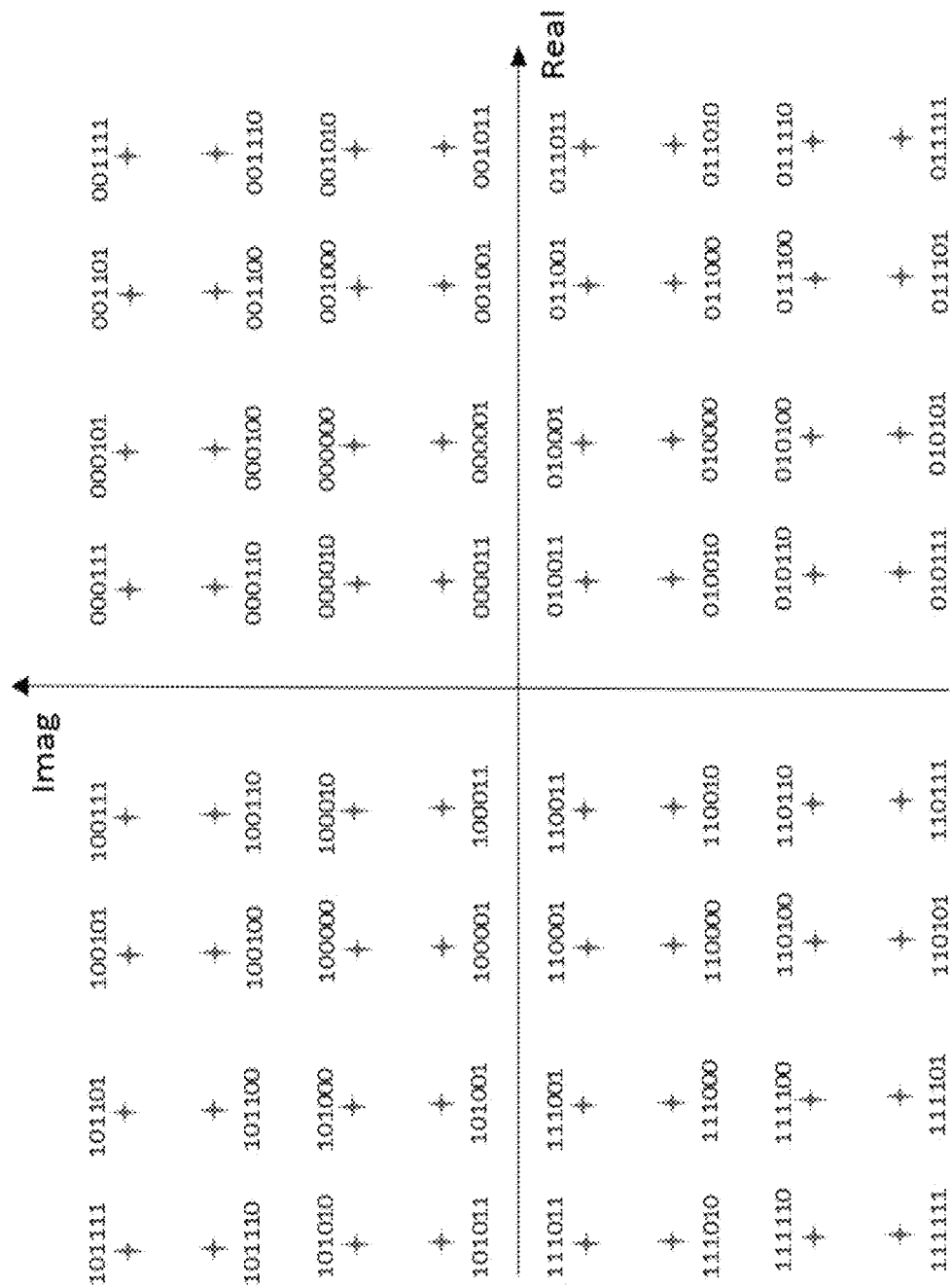
FIG. 8 is an illustration of a bit to symbol mapping for a 64 state quadrature amplitude modulation (64QAM) constellation used in updated scrambling bit sequence processing, in accordance with some embodiments.

FIG. 8 is an illustration of a bit to symbol mapping for a 64 state quadrature amplitude modulation (64QAM) constellation used in updated scrambling bit sequence processing, in accordance with some embodiments. The 64QAM constellation 800 denotes having each six consecutive coded binary bits $\vec{c}=\{b_0, b_1, b_2, b_3, b_4, b_5\}$ mapped to one symbol, as expressed with the following equation:

$$M(\vec{c}) = \frac{1}{\sqrt{42}}\{(1-2b_0)[4-(1-2b_2)[2-(1-2b_4)]] + j(1-2b_1)[4-(1-2b_3)[2-(1-2b_5)]]\}.$$

In the above equation, $b_0$ denotes the sign of the real part of the complex-valued modulation symbol, $b_1$ denotes the sign of the imaginary part, $b_2$ and $b_4$ are used to distinguish different coefficients of the real part (e.g., the columns on the constellation), $b_3$ and $b_5$ are used to distinguish different coefficients of the imaginary part (e.g., the rows on the constellation) of the complex-valued modulation symbol. For example, the scrambling bit sequence corresponding to 64QAM with spreading value $\{1\}$, $\{-1\}$, $\{j\}$, $\{-j\}$ is $\{0,0,0,0,0,0\}$, $\{1,1,0,0,0,0\}$, $\{1,0,0,0,0,0\}$ and $\{0,1,0,0,0,0\}$.

In certain embodiments, when $s_l=1$, then the original scrambling bit sequence is $\{0,0,0,0,0,0\}$, so the scrambling-XOR-bit is 0 and the result-bit-1, result-bit-2 and result-bit-3 all are all 0 and the updated scrambling bit sequence is $\{0,0,0,0,0,0\}$ irrespective of the data bit sequence. This may be expressed as follows:

$$M(\{\tilde{b}_0, \tilde{b}_1, \tilde{b}_2, \tilde{b}_3, \tilde{b}_4, \tilde{b}_5\}) =$$
$$(\{b_0, b_1, b_2, b_3, b_4, b_5\} \oplus \{\bar{a}_0, \bar{a}_1, \bar{a}_2, \bar{a}_3, \bar{a}_4, \bar{a}_5\}) =$$
$$M(\{b_0, b_1, b_2, b_3, b_4, b_5\} \oplus \{0, 0, 0, 0, 0, 0\}) =$$
$$M(\{b_0, b_1, b_2, b_3, b_4, b_5\}) * 1$$

In certain embodiments, $s_l=-1$ with the following relationship:

$$M(\vec{c}) * s_l = -\frac{1}{\sqrt{42}}\{(1-2b_0)[4-(1-2b_2)[2-(1-2b_4)]] - j(1-2b_1)[4-(1-2b_3)[2-(1-2b_5)]]\}$$

$$= \frac{1}{\sqrt{42}}\{(1-2(1-b_0))[4-(1-2b_2)[2-(1-2b_4)]] + j(1-2(1-b_1))[4-(1-2b_3)[2-(1-2b_5)]]\}$$
$$= M(\{1-b_0, 1-b_1, b_2, b_3, b_4, b_5\})$$

Then, in further embodiments, the original scrambling bit sequence is $\{1,1,0,0,0,0\}$, so the scrambling-XOR-bit is 0 and the result-bit-1, result-bit-2 and result-bit-3 are all 0 and the updated scrambling bit sequence is $\{1,1,0,0,0,0\}$ irrespective of the data bit sequence. This may be expressed as:

$$M(\{\tilde{b}_0, \tilde{b}_1, \tilde{b}_2, \tilde{b}_3, \tilde{b}_4, \tilde{b}_5\}) =$$
$$(\{b_0, b_1, b_2, b_3, b_4, b_5\} \oplus \{\bar{a}_0, \bar{a}_1, \bar{a}_2, \bar{a}_3, \bar{a}_4, \bar{a}_5\}) =$$
$$M(\{b_0, b_1, b_2, b_3, b_4, b_5\} \oplus \{1, 1, 0, 0, 0, 0,\}) =$$
$$M(\{1-b_0, 1-b_1, b_2, b_3, b_4, b_5\}) = M(\{b_0, b_1, b_2, b_3, b_4, b_5\}) * (-1)$$

In certain embodiments, $s_l=j$ with the following relationship:

$$M(\vec{c}) * s_l = j\frac{1}{\sqrt{42}}\{(1-2b_0)[4-(1-2b_2)[2-(1-2b_4)]] - (1-2b_1)[4-(1-2b_3)[2-(1-2b_5)]]\}$$
$$= \frac{1}{\sqrt{42}}\{(1-2(1-b_1))[4-(1-2b_3)[2-(1-2b_5)]] + j(1-b_0)[4-(1-2b_2)[2-(1-2b_4)]]\}$$
$$= M(\{1-b_1, b_0, b_3, b_2, b_5, b_4\})$$

Then, in further embodiments, the original scrambling bit sequence $\{a_0, a_1, a_2, a_3, a_4, a_5\}$ is $\{1,0,0,0,0,0\}$, so the scrambling-XOR-bit is 1. Also, when $b_0=b_1, b_2=b_3, b_4=b_5$ (e.g., $\{b_0, b_1, b_2, b_3, b_4, b_5\}=\{0,0,0,0,0,0\}$ or $\{0,0,0,0,1,1\}$ or $\{0,0,1,1,0,0\}$ or $\{0,0,1,1,1,1\}$ or $\{1,1,0,0,0,0\}$ or $\{1,1,0,0,1,1\}$ or $\{1,1,1,1,0,0\}$ or $\{1,1,1,1,1,1\}$), then the data-XOR-bit-1, data-XOR-bit-2 and data-XOR-bit-3 are all 0, and the result-bit-1, result-bit-2 and result-bit-3 are all 0. Thus the updated scrambling bit sequence is $\{1,0,0,0,0,0\}$ and the scrambled bit sequence of this symbol is $\{1-b_0, b_1, b_2, b_3, b_4, b_5\}$, which can be modulated to a symbol equivalent to the symbol modulated by $\{b_0, b_1, b_2, b_3, b_4, b_5\}$ and multiplied with $j$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{\bar{a}_0, \bar{a}_1, \bar{a}_2, \bar{a}_3, \bar{a}_4, \bar{a}_5\}) =$$
$$M(\{b_0, b_0, b_2, b_2, b_4, b_5\} \oplus \{1, 0, 0, 0, 0, 0\}) =$$
$$M(\{1-b_0, b_1, b_2, b_3, b_4, b_5\}) =$$
$$M(\{1-b_1, b_0, b_3, b_2, b_5, b_4\}) = M(\{b_0, b_1, b_2, b_3, b_4, b_5\}) * j$$

However, when $b_0=b_1, b_2=b_3, b_4=1-b_5$ (e.g., $\{b_0, b_1, b_2, b_3, b_4, b_5\}=\{0,0,0,0,0,1\}$ or $\{0,0,0,0,1,0\}$ or $\{0,0,1,1,0,1\}$ or $\{0,0,1,1,1,0\}$ or $\{1,1,0,0,0,1\}$ or $\{1,1,0,0,1,0\}$ or $\{1,1,1,1,0,1\}$ or $\{1,1,1,1,1,0\}$), then the updated scrambling bit sequence is $\{1,0,0,0,1,1\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{\bar{a}_0, \bar{a}_1, \bar{a}_2, \bar{a}_3, \bar{a}_4, \bar{a}_5\}) =$$

-continued $$M(\{b_0, b_0, b_2, b_2, b_4, b_5\} \oplus \{1, 0, 0, 0, 1, 1\}) =$$

$$M(\{1-b_0, b_1, b_2, b_3, 1-b_4, 1-b_5\}) =$$

$$M(\{1-b_1, b_0, b_3, b_2, b_5, b_4\}) = M(\{b_0, b_1, b_2, b_3, b_4, b_5\}) * j$$

However, when $b_0=b_1$, $b_2=1-b_3$, $b_4=b_5$ (e.g., $\{b_0, b_1, b_2, b_3, b_4, b_5\}=\{0,0,0,1,0,0\}$ or $\{0,0,0,1,1,1\}$ or $\{0,0,1,0,0,0\}$ or $\{0,0,1,0,1,1\}$ or $\{1,1,0,1,0,0\}$ or $\{1,1,0,1,1,1\}$ or $\{1,1,1,0,0,0\}$ or $\{1,1,1,0,1,1\}$), then the updated scrambling bit sequence is $\{1,0,1,1,0,0\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{\bar{a}_0, \bar{a}_1, \bar{a}_2, \bar{a}_3, \bar{a}_4, \bar{a}_5\}) =$$

$$M(\{b_0, b_0, b_2, b_2, b_4, b_5\} \oplus \{1, 0, 1, 1, 0, 0\}) =$$

$$M(\{1-b_0, b_1, b_2, b_3, 1-b_4, 1-b_5\}) =$$

$$M(\{1-b_1, b_0, b_3, b_2, b_5, b_4\}) = M(\{b_0, b_1, b_2, b_3, b_4, b_5\}) * j$$

However, when $b_0=b_1$, $b_2=1-b_3$, $b_4=1-b_5$ (e.g., $b_0,b_1,b_2,b_3,b_4,b_5=\{0,0,0,1,0,1\}$ or $\{0,0,0,1,1,0\}$ or $\{0,0,1,0,0,1\}$ or $\{0,0,1,0,1,0\}$ or $\{1,1,0,1,0,1\}$ or $\{1,1,0,1,1,0\}$ or $\{1,1,1,0,0,1\}$ or $\{1,1,1,0,1,0\}$), then the updated scrambling bit sequence is $\{1,0,1,1,1,1\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{a_0, a_1, a_2, a_3, a_4, a_5\}) =$$

$$M(\{b_0, b_0, b_2, b_2, b_4, b_5\} \oplus \{1, 0, 1, 1, 1, 1\}) =$$

$$M(\{1-b_0, b_1, 1-b_2, 1-b_3, 1-b_4, 1-b_5\}) =$$

$$M(\{1-b_1, b_0, b_3, b_2, b_5, b_4\}) = M(\{b_0, b_1, b_2, b_3, b_4, b_5\}) * j$$

However, when $b_0=1-b_1$, $b_2=b_3$, $b_4=b_5$ (e.g., $\{b_0,b_1,b_2,b_3,b_4,b_5\}=\{0,1,0,0,0,0\}$ or $\{0,1,0,0,1,1\}$ or $\{0,1,1,1,0,0\}$ or $\{0,1,1,1,1,1\}$ or $\{1,0,0,0,0,0\}$ or $\{1,0,0,0,1,1\}$ or $\{1,0,1,1,0,0\}$ or $\{1,0,1,1,1,1\}$), then the updated scrambling bit sequence is $\{0,1,0,0,0,0\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{a_0, a_1, a_2, a_3, a_4, a_5\}) =$$

$$M(\{b_0, b_0, b_2, b_2, b_4, b_5\} \oplus \{0, 1, 0, 0, 0, 0\}) =$$

$$M(\{b_0, 1-b_1, b_2, b_3, b_4, b_5\}) =$$

$$M(\{1-b_1, b_0, b_3, b_2, b_5, b_4\}) = M(\{b_0, b_1, b_2, b_3, b_4, b_5\}) * j$$

However, when $b_0=1-b_1$, $b_2=b_3$, $b_4=1-b_5$ (e.g., $\{b_0, b_1,b_2, b_3, b_4, b_5\}=\{0,1,0,0,0,1\}$ or $\{0,1,0,0,1,0\}$ or $\{0,1,1,1,0,1\}$ or $\{0,1,1,1,1,0\}$ or $\{1,0,0,0,0,1\}$ or $\{1,0,0,0,1,0\}$ or $\{1,0,1,1,0,1\}$ or $\{1,0,1,1,1,0\}$), then the updated scrambling bit sequence is $\{0,1,0,0,1,1\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{a_0, a_1, a_2, a_3, a_4, a_5\}) =$$

$$M(\{b_0, b_0, b_2, b_2, b_4, b_5\} \oplus \{0, 1, 0, 0, 1, 1\}) =$$

$$M(\{b_0, 1-b_1, b_2, b_3, 1-b_4, 1-b_5\}) =$$

$$M(\{1-b_1, b_0, b_3, b_2, b_5, b_4\}) = M(\{b_0, b_1, b_2, b_3, b_4, b_5\}) * j$$

However, when $b_0=1-b_1, b_2=1-b_3, b_4=1-b_5$ (e.g., $\{b_0,b_1, b_2,b_3, b_4,b_5\}=\{0,1,0,1,0,0\}$ or $\{0,1,0,1,1,1\}$ or $\{0,1,1,0,0,0\}$ or $\{0,1,1,0,1,1\}$ or $\{1,0,0,1,0,0\}$ or $\{1,0,0,1,1,1\}$ or $\{1,0,1,0,0,0\}$ or $\{1,0,1,0,1,1\}$), then the updated scrambling bit sequence is $\{0,1,1,1,0,0\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{a_0, a_1, a_2, a_3, a_4, a_5\}) =$$

$$M(\{b_0, b_0, b_2, b_2, b_4, b_5\} \oplus \{0, 1, 1, 1, 0, 0\}) =$$

$$M(\{b_0, 1-b_1, 1-b_2, 1-b_3, b_4, b_5\}) =$$

$$M(\{1-b_1, b_0, b_3, b_2, b_5, b_4\}) = M(\{b_0, b_1, b_2, b_3, b_4, b_5\}) * j$$

However, when $b_0=1-b_1,b_2=1-b_3,b_4=1-b_5$ (e.g., $\{b_0,b_1, b_2, b_3,b_4,b_5\}=\{0,1,0,1,0,1\}$ or $\{0,1,0,1,1,0\}$ or $\{0,1,1,0,0,1\}$ or $\{0,1,1,0,1,0\}$ or $\{1,0,0,1,0,1\}$ or $\{1,0,0,1,1,0\}$ or $\{1,0,1,0,0,1\}$ or $\{1,0,1,0,1,0\}$), then the updated scrambling bit sequence is $\{0,1,1,1,1,1\}$. This may be expressed as:

$$M(\{\tilde{b}_0, \tilde{b}_1, \tilde{b}_2, \tilde{b}_3, \tilde{b}_4, \tilde{b}_5\}) =$$

$$M(\{b_0, b_1, b_2, b_3, b_4, b_5\} \oplus \{a_0, a_1, a_2, a_3, a_4, a_5\}) =$$

$$M(\{b_0, b_0, b_2, b_2, b_4, b_5\} \oplus \{0, 1, 1, 1, 1, 1\}) =$$

$$M(\{b_0, 1-b_1, 1-b_2, 1-b_3, 1-b_4, 1-b_5\}) =$$

$$M(\{1-b_1, b_0, b_3, b_2, b_5, b_4\}) = M(\{b_0, b_1, b_2, b_3, b_4, b_5\}) * j$$

In certain embodiments, $s_f = -j$ with the following relationship:

$$M(\vec{c}) * s_l = -j\frac{1}{\sqrt{42}}\{(1-2b_0)[4-(1-2b_2)[2-(1-2b_4)]] +$$

$$(1-2b_1)[4-(1-2b_3)[2-(1-2b_5)]]\} =$$

$$\frac{1}{\sqrt{42}}\{(1-2b_1)[4-(1-2b_3)[2-(1-2b_5)]] +$$

$$j(1-2(1-b_0))[4-(1-2b_2)[2-(1-2b_4)]]\} =$$

$$M(\{b_1, 1-b_0, b_3, b_2, b_5, b_4\})$$

Then, in further embodiments, the original scrambling bit sequence $\{a_0, a_1, a_2, a_3, a_4, a_5\}$ is $\{0,1,0,0,0,0\}$, so the scrambling-XOR-bit is 1. Also, when $b_0=b_1, b_2=b_3, b_4=b_5$ (e.g., $\{b_0, b_1, b_2,b_3,b_4,b_5\}$ $\{0,0,0,0,0,0\}$ or $\{0,0,0,0,1,1\}$ or $\{0,0,1,1,0,0\}$ or $\{0,0,1,1,1,1\}$ or $\{1,1,0,0,0,0\}$ or $\{1,1,1,0,0,1,1\}$ or $\{1,1,1,1,0,0\}$ or $\{1,1,1,1,1,1\}$), then the data-XOR-bit-1,data-XOR-bit-2 and data-XOR-bit-3 are all 0, and the result-bit-1, result-bit-2 and result-bit-3 are all 0. Thus the updated scrambling bit sequence is $\{0,1,0,0,0,0\}$ and the scrambled bit sequence of this symbol is $\{b_0,1-b_1,b_2,b_3,b_4, b_5\}$, which can be modulated to a symbol equivalent to the symbol modulated by $\{b_0, b_1, b_2, b_3, b_4, b_5\}$ and multiplied with $-j$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{0, 1, 0, 0, 0, 0\}) =$$
$$M(\{b_0, 1-b_1, b_2, b_3, b_4, b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=b_1$, $b_2=b_3$, $b_4=1-b_5$ (e.g., $\{b_0, b_1, b_2, b_3, b_4, b_5\}$ $\{0,0,0,0,0,1\}$ or $\{0,0,0,0,1,0\}$ or $\{0,0,1,1,0,1\}$ or $\{0,0,1,1,1,0\}$ or $\{1,1,0,0,0,1\}$ or $\{1,1,0,0,1,0\}$ or $\{1,1,1,1,0,1\}$ or $\{1,1,1,1,1,0\}$), then the updated scrambling bit sequence is $\{0,1,0,0,1,1\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{0, 1, 0, 0, 1, 1\}) =$$
$$M(\{b_0, 1-b_1, b_2, b_3, 1-b_4, 1-b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=b_1$, $b_2=1-b_3$, $b_4=b_5$ (e.g., $\{b_0,b_1, b_2,b_3, b_4,b_5\}=\{0,0,0,1,0,0\}$ or $\{0,0,0,1,1,1\}$ or $\{0,0,1,0,0,0\}$ or $\{0,0,1,0,1,1\}$ or $\{1,1,0,1,0,0\}$ or $\{1,1,0,1,1,1\}$ or $\{1,1,1,0,0,0\}$ or $\{1,1,1,0,1,1\}$), then the updated scrambling bit sequence is $\{0,1,1,1,0,0\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{0, 1, 1, 1, 0, 0\}) =$$
$$M(\{b_0, 1-b_1, b_2, b_3, 1-b_4, 1-b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=b_1$, $b_2=1-b_3$, $b_4=1-b_5$ (e.g., $\{b_0, b_1, b_2, b_3, b_4, b_5\}=\{0,0,0,1,0,1\}$ or $\{0,0,0,1,1,0\}$ or $\{0,0,1,0,0,1\}$ or $\{0,0,1,0,1,0\}$ or $\{1,1,0,1,0,1\}$ or $\{1,1,0,1,1,0\}$ or $\{1,1,1,0,0,1\}$ or $\{1,1,1,0,1,0\}$), then the updated scrambling bit sequence is $\{0,1,1,1,1,1\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{0, 1, 1, 1, 1, 1\}) =$$
$$M(\{b_0, 1-b_1, 1-b_2, 1-b_3, 1-b_4, 1-b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=1-b_1$, $b_2=b_3$, $b_4=b_5$ (e.g., $\{b_0,b_1, b_2,b_3, b_4,b_5\}=\{0,1,0,0,0,0\}$ or $\{0,1,0,0,1,1\}$ or $\{0,1,1,1,0,0\}$ or $\{0,1,1,1,1,1\}$ or $\{1,0,0,0,0,0\}$ or $\{1,0,0,0,1,1\}$ or $\{1,0,1,1,0,0\}$ or $\{1,0,1,1,1,1\}$), then the updated scrambling bit sequence is $\{1,0,0,0,0,0\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{1, 0, 0, 0, 0, 0\}) =$$
$$M(\{1-b_0, b_1, b_2, b_3, b_4, b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=1-b_1, b_2=b_3, b_4=1-b_5$ (e.g., $\{b_0, b_1,b_2, b_3,b_4, b_5\}=\{0,1,0,0,0,1\}$ or $\{0,1,0,0,1,0\}$ or $\{0,1,1,1,0,1\}$ or $\{0,1,1,1,1,0\}$ or $\{1,0,0,0,0,1\}$ or $\{1,0,0,0,1,0\}$ or $\{1,0,1,1,0,1\}$ or $\{1,0,1,1,1,0\}$), then the updated scrambling bit sequence is $\{1,0,0,0,1,1\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{1, 0, 0, 0, 1, 1\}) =$$
$$M(\{1-b_0, b_1, b_2, b_3, 1-b_4, 1-b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=1-b_1$, $b_2=1-b_3$, $b_4=b_5$ (e.g., $\{b_0, b_1, b_2, b_3, b_4, b_5\}=\{0,1,0,1,0,0\}$ or $\{0,1,0,1,1,1\}$ or $\{0,1,1,0,0, 0\}$ or $\{0,1,1,0,1,1\}$ or $\{1,0,0,1,0,0\}$ or $\{1,0,0,1,1,1\}$ or $\{1,0,1,0,0,0\}$ or $\{1,0,1,0,1,1\}$), then the updated scrambling bit sequence is $\{1,0,1,1,0,0\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{1, 0, 1, 1, 0, 0\}) =$$
$$M(\{1-b_0, b_1, 1-b_2, 1-b_3, b_4, b_5\}) =$$
$$M(\{b_1, 1-b_0, b_3, b_2, b_5, b_4\}) = M(\{b_0, b_1, b_2, b_3, b_4, b_5\}*(-j)$$

However, when $b_0=1-b_1$, $b_2=1-b_3$, $b_4=1-b_5$ (e.g., $\{b_0, b_1, b_2, b_3, b_4, b_5\}=\{0,1,0,1,0,1\}$ or $\{0,1,0,1,1,0\}$ or $\{0,1,1,0,0,1\}$ or $\{0,1,1,0,1,0\}$ or $\{1,0,0,1,0,1\}$ or $\{1,0,0,1,1,0\}$ or $\{1,0,1,0,0,1\}$ or $\{1,0,1,0,1,0\}$), then the updated scrambling bit sequence is $\{1,0,1,1,1,1\}$. This may be expressed as:

$$M(\{\tilde{b}_0, \tilde{b}_1, \tilde{b}_2, \tilde{b}_3, \tilde{b}_4, \tilde{b}_5\}) =$$
$$M(\{b_0, b_1, b_2, b_3, b_4, b_5\} \oplus \{a_0, a_1, a_2, a_3, a_4, a_5\}) =$$
$$M(\{b_0, b_0, b_2, b_2, b_4, b_5\} \oplus \{1, 0, 1, 1, 1, 1\}) =$$
$$M(\{1-b_0, b_1, 1-b_2, 1-b_3, 1-b_4, 1-b_5\}) =$$
$$M(\{b_1, 1-b_0, b_3, b_2, b_5, b_4\}) = M(\{b_0, b_1, b_2, b_3, b_4, b_5\}*(-j)$$

Although certain implementations of either an updated scrambling bit sequence processing or updated data bit sequence processing are discussed above, updated scrambling bit sequence processing or updated data bit sequence processing may be implemented in any of a number of additional ways as desired for different applications in various embodiments. For example, updated scrambling bit sequence processing may reference a 256 state QAM (256QAM) where each six consecutive coded binary bits $\vec{c} = \{b_0, b_1, b_2, b_3, b_4, b_5, b_6, b_7\}$ are mapped to one symbol as expressed with the following equation:

$$M(\vec{c}) = \frac{1}{\sqrt{170}}\{(1-2b_0)[8-(1-2b_2)[4-(1-2b_4)[2-(1-2b_6)]]] + j(1-2b_1)[8-(1-2b_3)[4-(1-2b_5)[2-(1-2b_7)]]]\}.$$

Also, in certain embodiments, the scrambling bit sequence corresponding to 256QAM to symbol multiplexing value $\{1\}, \{-1\}, \{j\}, \{-j\}$ is $\{0,0,0,0,0,0\}, \{1,1,0,0,0,0,0,0\}, \{1,0,0,0,0,0,0,0\}$ and $\{0,1,0,0,0,0,0,0\}$. As demonstrated above, further implementations of updated scrambling bit sequence processing may scramble a data bit sequence produce a scrambled data bit sequence that is then modulated to produce a symbol sequence. This symbol sequence may be equivalent to another symbol sequence produced by having the same data bit sequence being directly modulated and symbol spread without symbol level scrambling within the domain of $\{1\}, \{-1\}, \{j\}, \{-j\}$.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
encoding user data to produce a first data bit sequence;
generating a result bit sequence based on a first scrambling bit sequence and the first data bit sequence;
transmitting a signal based on a scrambled data bit sequence scrambled with the result bit sequence;
performing an exclusive OR (XOR) operation on two adjacent most significant bits of the first scrambling bit sequence to produce a scrambling bit value;
performing the XOR operation on each two adjacent bits of the first data bit sequence to produce a second data bit sequence; and
performing an AND operation on the scrambling bit value and the second data bit sequence to produce the result bit sequence.

2. The method of claim 1, further comprising:
performing the XOR operation on the result bit sequence with each corresponding two adjacent bits of the first scrambling bit sequence to produce an updated scrambling bit sequence; and
scrambling the first data bit sequence with the updated scrambling bit sequence to produce the scrambled data bit sequence.

3. The method of claim 1, further comprising:
performing the XOR operation on the result bit sequence with each corresponding two adjacent bits of the first data bit sequence to produce an updated data bit sequence; and
scrambling the updated data bit sequence with the first scrambling bit sequence to produce the scrambled data bit sequence.

4. The method of claim 1, further comprising:
producing the first data bit sequence by duplicating an initial data bit sequence a number of times to achieve a length associated with a symbol spreading value.

5. The method of claim 1, wherein the first data bit sequence is associated with a single symbol.

6. The method of claim 1, further comprising:
modulating the scrambled data bit sequence into multiple symbols.

7. The method of claim 1, further comprising:
modulating the scrambled data bit sequence using quadrature phase shift keying (QPSK).

8. The method of claim 1, further comprising:
modulating the scrambled data bit sequence using a quadrature amplitude modulation (QAM) complex-valued modulation constellation, which is symmetrical about two axes;
wherein the QAM complex-valued modulation constellation is associated with least one of: a 16QAM, a 64QAM, a 256QAM, and a 1024QAM.

9. A non-transitory computer-readable medium having stored thereon computer-executable instructions for carrying out the method claim 1.

10. A method performed by a communication node, comprising:
encoding user data to produce a first data bit sequence;
generating a result bit sequence based on a first scrambling bit sequence and the first data bit sequence;
transmitting a signal based on a scrambled data bit sequence scrambled with the result bit sequences;
performing an exclusive OR (XOR) operation on two adjacent most significant bits of the first scrambling bit sequence to produce a scrambling bit value;
performing the XOR operation on each two adjacent bits of the first data bit sequence to produce a second data bit sequence; and
performing an AND operation on the scrambling bit value and the second data bit sequence to produce the result bit sequence.

11. The method of claim 10, further comprising:
performing the XOR operation on the result bit sequence with each corresponding two adjacent bits of the first scrambling bit sequence to produce an updated scrambling bit sequence; and
scrambling the first data bit sequence with the updated scrambling bit sequence to produce the scrambled data bit sequence.

12. The method of claim 10, further comprising:
performing the XOR operation on the result bit sequence with each corresponding two adjacent bits of the first data bit sequence to produce an updated data bit sequence; and
scrambling the updated data bit sequence with the first scrambling bit sequence to produce the scrambled data bit sequence.

13. The method of claim 10, further comprising:
producing the first data bit sequence by duplicating an initial data bit sequence a number of times to achieve a length associated with a symbol spreading value.

14. The method of claim 10, wherein the first data bit sequence is associated with a single symbol.

15. The method of claim 10, further comprising:
modulating the scrambled data bit sequence into multiple symbols.

16. The method of claim 10, further comprising:
modulating the scrambled data bit sequence using quadrature phase shift keying (QPSK).

17. The method of claim 10, further comprising:
modulating the scrambled data bit sequence using a quadrature amplitude modulation (QAM) complex-valued modulation constellation, which is symmetrical about two axes;

wherein the QAM complex-valued modulation constellation is associated with least one of: a 16QAM, a 64QAM, a 256QAM, and a 1024QAM.

18. A non-transitory computer-readable medium having stored thereon computer-executable instructions for carrying out the method claim 10.

* * * * *